(12) United States Patent
Fissette et al.

(10) Patent No.: US 10,471,539 B2
(45) Date of Patent: Nov. 12, 2019

(54) CONTAINMENT DEVICE FOR A LASER HEAD AND ASSOCIATED MANUFACTURING METHOD

(71) Applicant: Bombardier Transportation GmbH, Berlin (DE)

(72) Inventors: Simon Fissette, La Pocatiere (CA); Lorraine Blais, St-Aubert (CA); Mario Legault, St-Pacome (CA); Daniel Chénard, La Pocatiere (CA); Gabriel Caron-Guillemette, St-Jean-Port-Joli (CA); Michel Bochud, La Pocatiere (CA)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 15/278,720

(22) Filed: Sep. 28, 2016

(65) Prior Publication Data

US 2018/0085854 A1 Mar. 29, 2018

(51) Int. Cl.
*B23K 26/12* (2014.01)
*B23K 37/04* (2006.01)
(Continued)

(52) U.S. Cl.
CPC ............ *B23K 26/127* (2013.01); *B23K 26/03* (2013.01); *B23K 26/0884* (2013.01);
(Continued)

(58) Field of Classification Search
CPC .. B23K 26/03; B23K 26/0884; B23K 26/127; B23K 26/1476; B23K 26/26; B23K 37/0461; G05B 2219/45135; Y10S 901/42
(Continued)

(56) References Cited

U.S. PATENT DOCUMENTS 5,089,685 A 2/1992 Schmidt-Hebbel
6,667,456 B2 12/2003 Mukasa et al.
(Continued)

FOREIGN PATENT DOCUMENTS

DE 2152100 A1 4/1973
DE 4331262 A1 3/1995
(Continued)

*Primary Examiner* — Tu B Hoang
*Assistant Examiner* — Diallo I Duniver
(74) *Attorney, Agent, or Firm* — The Webb Law Firm

(57) ABSTRACT

A laser containment device, adapted to be mounted to a laser head, has an outer shell and an inner wall defining a peripheral chamber there in-between. An inner seal and an outer seal, respectively mounted to the outer shell and to the inner wall, are adapted to contact a workpiece. The peripheral chamber, encircling an opening in the laser containment device for letting a laser beam reach a workpiece, may be connected to a differential pressure generator operative to generate a differential pressure therein. A pressure sensor is located within the peripheral chamber to read the differential pressure. In use, the laser head, mounted to a computer-controlled manipulator, emits its laser beam. The pressure sensor sends its pressure readings to a controller which compares their values with a predetermined pressure threshold. If the pressure readings cross this threshold, the controller stops the emission of the laser beam.

24 Claims, 6 Drawing Sheets

(51) Int. Cl.
  *B23K 26/03*    (2006.01)
  *B23K 26/08*    (2014.01)
  *B23K 26/14*    (2014.01)
  *B23K 26/26*    (2014.01)

(52) U.S. Cl.
  CPC .......... *B23K 26/1476* (2013.01); *B23K 26/26* (2013.01); *B23K 37/0461* (2013.01); *G05B 2219/45135* (2013.01); *Y10S 901/42* (2013.01)

(58) Field of Classification Search
  USPC .................................. 219/121.62, 74, 121.84
  See application file for complete search history.

(56) References Cited

U.S. PATENT DOCUMENTS

| | | | |
|---|---|---|---|
| 8,053,701 B2 | 11/2011 | Will et al. | |
| 8,207,472 B2 | 6/2012 | Kosmowski | |
| 9,358,638 B2 | 6/2016 | Hori et al. | |
| 2007/0119016 A1* | 5/2007 | Drevitson | A47L 7/0085 15/339 |
| 2009/0179016 A1* | 7/2009 | McElroy | B23K 26/032 219/121.69 |
| 2009/0255910 A1 | 10/2009 | Feistel | |
| 2011/0042983 A1* | 2/2011 | Yi | H01L 21/6838 294/65 |
| 2014/0197141 A1 | 7/2014 | Dorey et al. | |
| 2015/0190886 A1 | 7/2015 | Huonker | |

FOREIGN PATENT DOCUMENTS

| | | | |
|---|---|---|---|
| DE | 10255747 A1 | 6/2004 | |
| EP | 2488327 B1 | 10/2013 | |
| FR | 2994116 A1 | 2/2014 | |
| JP | 57156888 A | 9/1982 | |
| JP | 2008143388 A * | 6/2008 | ............ B08B 3/024 |
| WO | 2011045098 A1 | 4/2011 | |
| WO | 2013152759 A1 | 10/2013 | |

* cited by examiner

CONTAINMENT DEVICE FOR A LASER HEAD AND ASSOCIATED MANUFACTURING METHOD

FIELD OF THE INVENTION

The present invention generally relates to the field of manufacturing operations using a laser. More specifically, the invention relates to a containment device for an industrial laser head preventing hazardous laser light from escaping the device and allowing the use of the laser head in an open environment.

BACKGROUND OF THE INVENTION

Industrial laser equipment is commonly used for different industrial activities such as cutting, welding, cleaning, machining and engraving of many solid materials. Because of the high energy levels emitted by the laser beams of laser heads on such pieces of equipment, it is common to place such laser equipment within a closed room so that it can be isolated from workers, thereby preventing any incident where radiations of the laser beam could reach a worker.

Not only such dedicated rooms represent a considerable investment, they also require much dedicated space in a manufacturing plant and offer low flexibility when it comes to the size of objects they can accommodate. To alleviate these problems, laser containment devices are now preferably used over laser heads, thereby eliminating the need of a dedicated laser processing room. However, such containment devices need to have flexible flanges in order to accommodate small irregularities in workpieces. However, these flanges, when flexing, may leave a gap with the workpiece so that radiations from the laser beam may escape and potentially endanger a worker in the vicinity of the laser processing equipment.

There is therefore a need for an improved laser processing equipment and for an improved processing method using such laser processing equipment.

SUMMARY OF THE INVENTION

It is an object of the present invention to provide a laser containment device, a laser processing equipment and a processing method that overcomes or mitigates one or more disadvantages of known laser processing equipment and processing methods, or at least provides a useful alternative.

The invention provides the advantages of preventing harmful laser beam radiations from escaping and hurting a person in the vicinity of a laser processing equipment.

In accordance with an embodiment of the present invention, there is provided a laser containment device for containing a laser beam emitted by a laser head used to process a workpiece. The laser containment device comprises an outer shell, an inner wall, an inner seal, an outer seal and a pressure sensor. The outer shell encloses at least partially a containment chamber. The outer shell is adapted to receive the laser head. The laser head may be either secured to an interior of the outer shell, that is within the containment chamber, or to an exterior of the outer shell. In the case where the laser head is mounted to the exterior of the outer shell, a main port in the outer shell is adapted to receive the laser beam of the laser head while a bottom opening in a bottom face of the outer shell is adapted to allow the laser beam to reach the workpiece. The outer shell and the inner wall define there in-between a peripheral chamber. The peripheral chamber, which is open at the bottom face, encircles the bottom opening. The peripheral chamber has a pressure port so as to be connected to a differential pressure generator which is operative to generate a differential pressure within the peripheral chamber. In use, this differential pressure has to be above or below that of an ambient pressure outside the outer shell.

The inner seal and the outer seal are respectively mounted to the inner wall and to the outer shell, proximate the bottom face. Both seals are designed to contact the workpiece and prevent laser beam radiation from escaping the laser containment device. In order to read the differential pressure, the pressure sensor is connected to the peripheral chamber. The pressure sensor may be mounted within the peripheral chamber.

In use, the peripheral chamber is placed at the differential pressure by the differential pressure generator. The pressure sensor is operative to detect the differential pressure within the peripheral chamber.

For mounting to a laser head, the laser containment device may further include attachments on the outer shell. Such attachments may be as simple as screws or any convenient mounting means.

The outer shell may be equipped with a vent to vent the containment chamber outside the outer shell.

Preferably, the main port is located opposite the bottom opening so that the laser head may shoot its laser beam straight through the bottom opening, thereby avoiding the use of mirrors.

Optionally, the outer shell may be equipped with an accessory port used to accommodate a conventional welding device such as a Gas Metal Arc Welding (GMAW) or Gas Tungsten Arc Welding (GTAW) torch.

Optionally, the peripheral chamber may be split in at least two sub-chambers using as many dividers. Each one of the at least two dividers is equipped with a third seal, again proximate the bottom face so as to contact the workpiece. Each one of the at least two sub-chambers is equipped with at least one of the pressure sensor. The advantage of doing so is to more accurately measure the differential pressure inside the sub-chambers.

The laser containment device may be equipped with a controller. The controller is operative to stop the laser beam upon the detection of a pressure inside the peripheral chamber which crosses a predetermined threshold.

Optionally, the laser head is a laser welding head.

In accordance with another embodiment of the present invention there is provided a laser processing equipment for processing a workpiece. The laser processing equipment comprises a manipulator, a laser head, the laser containment device described here above, a differential pressure generator and a controller. The laser head, which is operative to emit a laser beam, is connected to a working extremity of the manipulator. The laser head is mounted to the outer shell. The controller is operative to shut down an emission of the laser beam from the laser head upon receiving a signal from the pressure sensor that the differential pressure within the peripheral chamber has crossed a predetermined threshold.

Preferably, the manipulator is a computer-controlled robotic arm.

The peripheral chamber itself may be split in at least two sub-chambers by as many dividers. Each one of the at least two dividers is equipped with a third seal proximate the bottom face and each one of the at least two sub-chambers may be equipped with at least one of the pressure sensor which are preferably placed inside the peripheral chamber.

Optionally, the laser head is a laser welding head and the laser processing equipment is a laser welding equipment.

Advantageously, a second welding device such as a GMAW or GTAW torch may be accommodated by the laser containment device. This second welding device may be mounted either to the laser containment device, to the laser head or to the manipulator, reaching within the containment chamber through a accessory port and pointing at the bottom opening so as to be operative to weld the workpiece.

In accordance with another embodiment of the present invention, there is provided a method of laser processing a workpiece using a laser containment device operatively connected to a laser head operative to emit a laser beam. The method comprises:

at least partially sealing against the workpiece a peripheral chamber of said laser containment device, said peripheral chamber being located at a working end of the containment device and encircling an opening accommodating said laser beam;
creating a differential pressure zone in the peripheral chamber;
detecting a pressure value in the peripheral chamber;
comparing the detected pressure value with a predetermined threshold; and
deciding whether or not to emit the laser beam towards the workpiece based on a result of the comparison.

Optionally, the method may further comprise turning off the emission of the laser beam if the predetermined threshold is crossed.

Advantageously, the method may further comprise guiding the laser head using a computer-controlled robotic arm.

Preferably, the processing is welding.

In accordance with yet another embodiment of the present invention, there is provided a method of laser processing a workpiece comprising detecting a pressure value in a peripheral chamber of a containment device connected to a laser head emitting a laser beam for processing the workpiece. The peripheral chamber which encircles the laser beam and which is at a pressure different from that of an atmospheric pressure, is at least partially sealed against the workpiece at a working end of the containment device.

Optionally, the method further comprises comparing the detected pressure value with a predetermined threshold and turning off the emission of the laser beam if the predetermined threshold is crossed by the detected pressure.

Preferably, the method comprises guiding the laser head using a computer-controlled robotic arm.

More preferably, the processing is welding.

BRIEF DESCRIPTION OF DRAWINGS

These and other features of the present invention will become more apparent from the following description in which reference is made to the appended drawings wherein.

DETAILED DESCRIPTION OF THE INVENTION

The present invention relates to a laser containment device for containing a laser beam emitted by a laser head used to process a workpiece, to a laser processing equipment using such a laser containment device and to a method of laser processing. Advantageously, the laser containment device is capable of detecting a change in internal pressure indicative of a break of a seal against the workpiece. By stopping an emission of the laser beam upon this detection, a controller may help in preventing harmful laser beam radiations from escaping the laser containment device.

The present invention may be used in combination with many type of laser head and laser processing equipment for different industrial processes. Such industrial processes may include cutting, welding, cleaning, machining, engraving, additive manufacturing, etc. In all cases, the common point is that a laser head emitting a laser beam is used in the processing. To ease the understanding, a specific example of the present invention applied to the welding process will be described hereafter. It will be understood however that the same principles may be used for the other processes.

Figure 1:
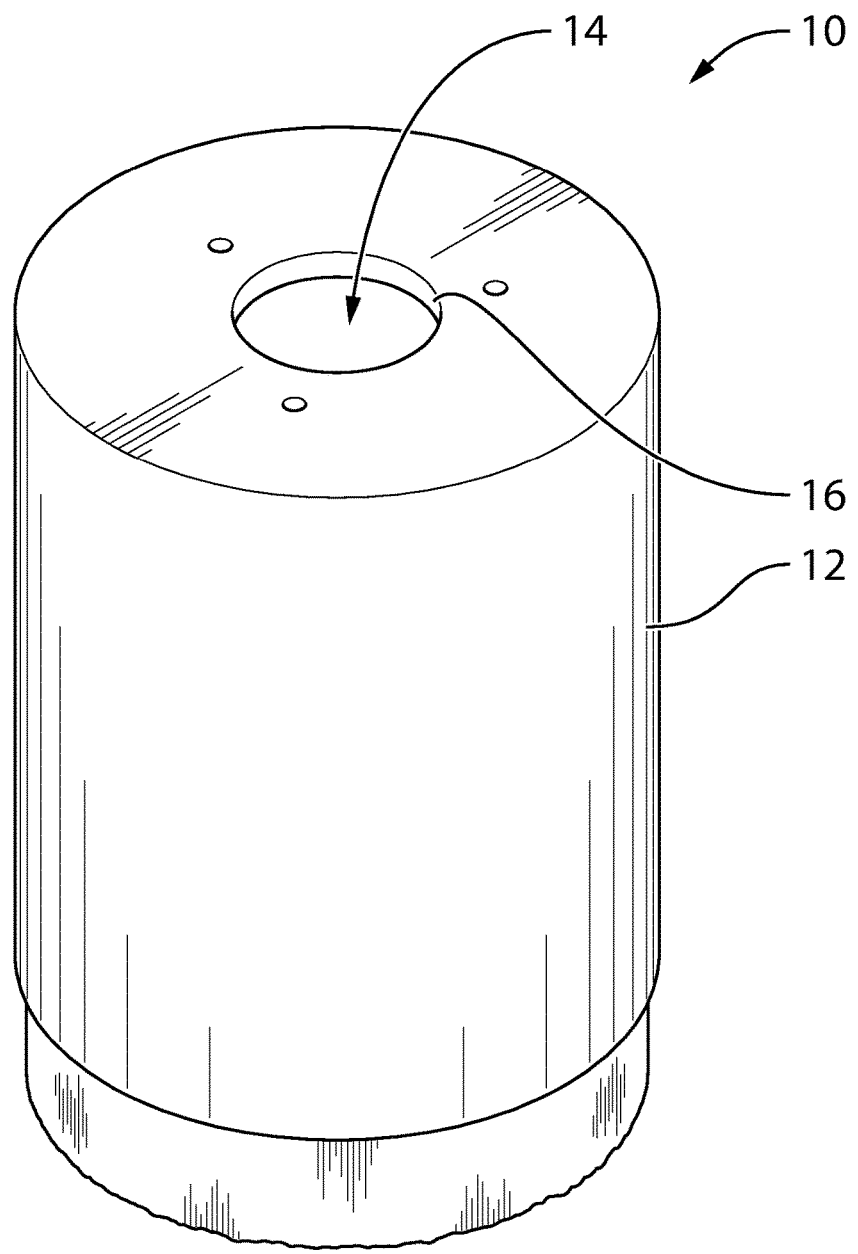
FIG. 1 is an isometric view of a laser containment device in accordance with an embodiment of the present invention.
Figure 2:
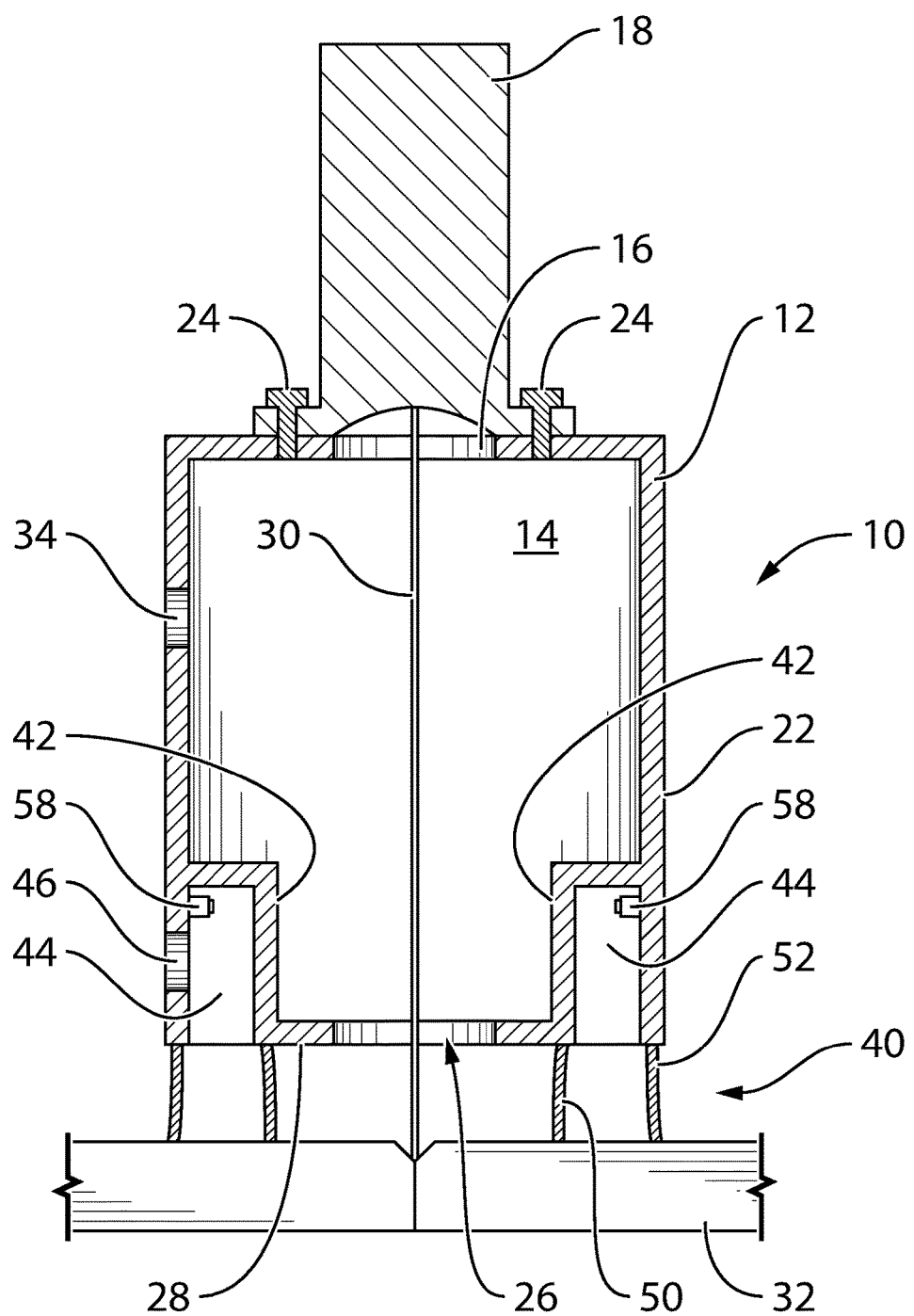
FIG. 2 is a cross-sectional front view of the laser containment device of FIG. 1 connected to a laser head.

FIG. 1 is referred to. The laser containment device 10 comprises an outer shell 12 enclosing at least partially a containment chamber 14. A main port 16 is adapted to receive a laser welding head 18, best shown in FIG. 2 now concurrently referred to. The main port 16 is preferably centered at a top face 20 of the outer shell 12, but could also be placed off-center or even on a side wall 22 of the outer shell 12.

The laser welding head 18 is secured to the outer shell 12 with attachments 24. Although such attachments 18 could be permanent, such as a weld or rivets, they are preferably removable, such as screws, a latch or any other known convenient non-permanent mounting means, so that the laser containment device 10 may be fitted to different laser welding heads 18.

A bottom opening 26, provided at a bottom face 28 of the outer shell 12, is used to allow the laser beam 30 to reach the workpiece 32. The laser welding head 18 is installed over the main port 16 in the outer shell 12, which is preferably opposite and aligned with the bottom opening 26 so that the laser welding head 18 may shoot its laser beam 30 straight through the bottom opening. Alternatively, the main port 16 and the laser welding head could be mounted non-aligned with the bottom opening 26, while still aiming to the workpiece 32 through the bottom opening 26. Another option may be to use a mirror system inside the containment chamber 14 to redirect the laser beam 30 from the laser welding head 18 through the bottom opening 26.

The outer shell 12 may be equipped with a vent 32 to vent the containment chamber 14 outside the outer shell 12.

The outer shell 12 may also be equipped with an accessory port 36 used to accommodate a conventional welding device such as a GMAW or GTAW torch. This welding device may be mounted either to the laser containment device 10, to the laser welding head 18 or directly to a manipulator 64 (best shown in FIG. 5), reaching within the containment chamber 14 through an accessory port 36 and pointing at the bottom opening 26 so as to be operative to weld the workpiece 32.

Figure 3:
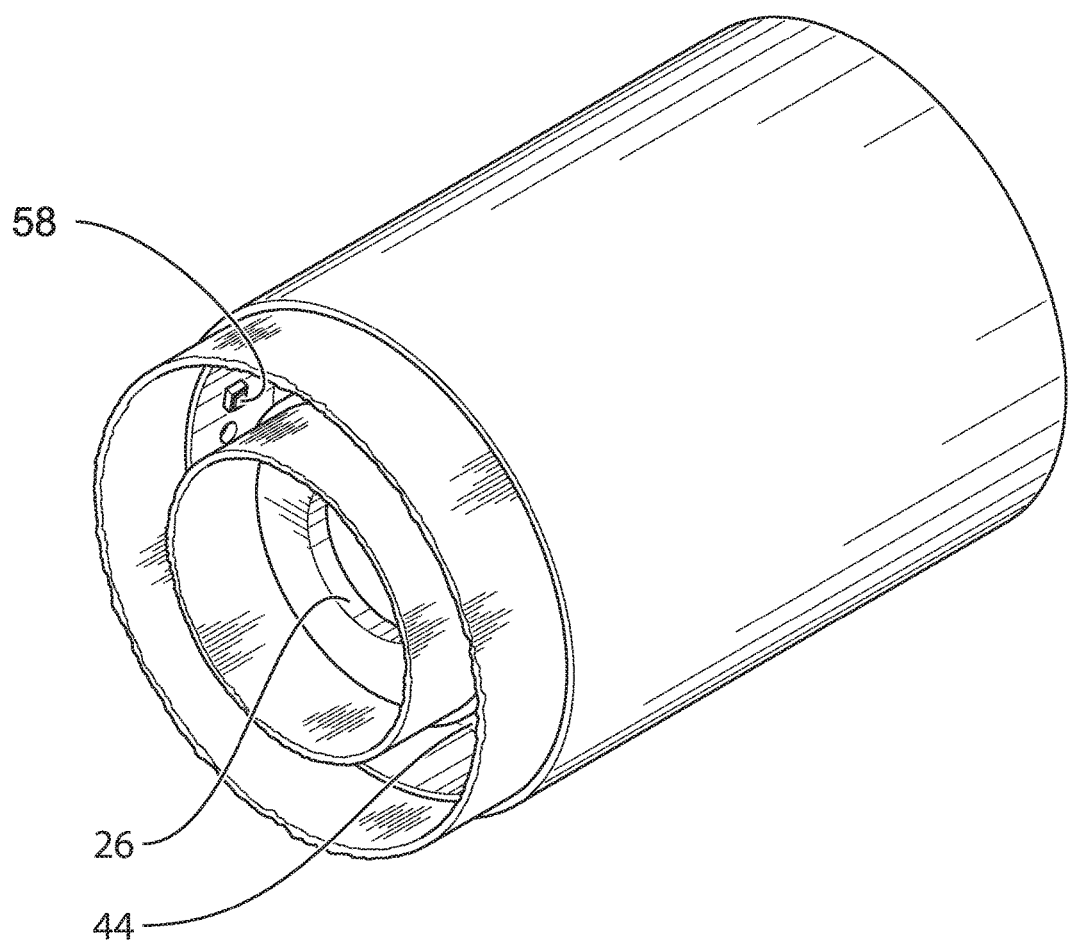
FIG. 3 is an isometric view from below of the laser containment device of FIG. 1.

FIG. 3 is now concurrently referred to. At least at a working extremity 40 of the laser containment device 10, an inner wall 42 extend inside the outer shell 12. It is possible to have this inner wall 42 extend a whole height of the side wall 22, but this is not really advantageous. The outer shell 12 and the inner wall 42 define there in-between a peripheral chamber 44. This peripheral chamber 44, which is open at the bottom face 28, encircles the bottom opening 26. The peripheral chamber 44 has a pressure port 46 so as to be connected to a differential pressure generator 48 (best shown in FIG. 5, now concurrently referred to). The differential pressure generator 48 is operative to generate a differential pressure within the peripheral chamber 44. Herein, differential pressure is defined as a pressure that is different than an ambient pressure outside the outer shell 12 of laser containment device 10, which ambient pressure usually corresponds to an atmospheric pressure. Hence, the differential pressure may be lower or higher than the ambient pressure. The difference between the differential pressure and the ambient pressure must constantly be larger than a threshold so that if a leak occurs, it may eventually cross the threshold. Because the present invention works with both a differential pressure that is higher or lower than the ambient pressure, there may be cases where the differential pressure needs to remain below the absolute value of the threshold (in case a vacuum is created in the peripheral chamber) and cases where the differential pressure needs to remain above the absolute value of the threshold (in case a pressurized peripheral chamber is used). Hence, whether the threshold is crossed from above or from below, depending on the type of differential pressure, it triggers something to be true.

Advantageously, the laser containment de vice 10 may be used in combination with different types of differential pressure generator 48. For example, if a compressor is used as the differential pressure generator 48, then a high pressure condition (higher than the ambient pressure) will be created within the peripheral chamber 44. Conversely, if a vacuum pump is used as the differential pressure generator 48, then a low pressure condition (lower than the ambient pressure) is created within the peripheral chamber 44.

An inner seal 50 and an outer seal 52 are respectively mounted to the inner wall 42 and to the outer shell 12, proximate the bottom face 28. Both inner and outer seals 50, 52 are designed to contact the workpiece 32 and prevent laser beam radiation from escaping the laser containment device 10. Such seals may use bristles, a flexible lip, a deformable open or closed-section seal, or any other type of adequate seal. Both inner and outer seals 50, 52 could also be formed into one piece (i.e. a seal assembly having two lips corresponding to the outer and the inner seals 50, 52). Such inner and outer seals 50, 52 need to be sufficiently flexible so as to conform as much as possible to variations in the surface of the workpiece 32. Such variations may be either depressions, such as welding chamfers, or may bulge from the workpiece 32, such as an existing weld joint for example.

Figure 4:
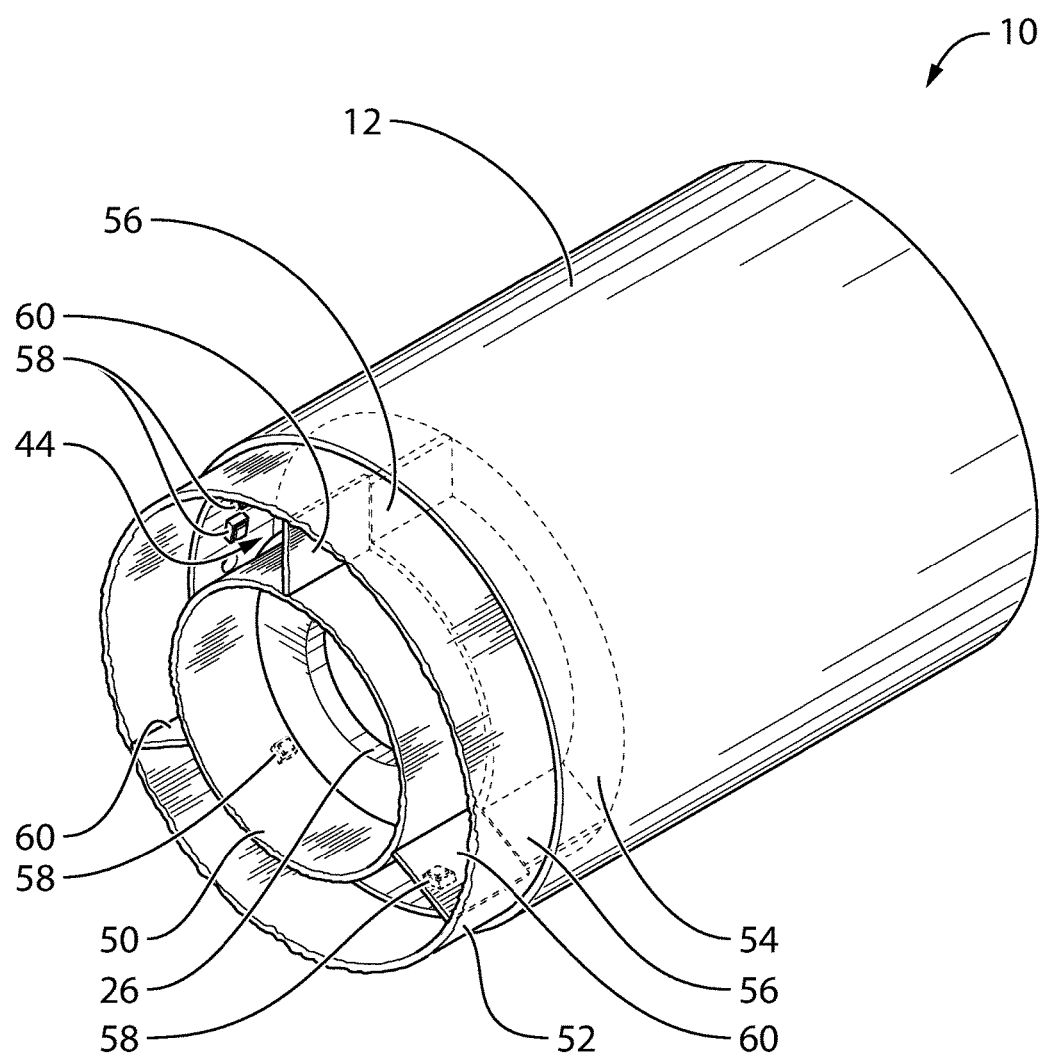
FIG. 4 is an isometric view from below of a laser containment device in accordance with another embodiment of the present invention.

Optionally, the peripheral chamber 44 may be split in at least two sub-chambers 54 using as many dividers 56. This option is shown in FIG. 4, now concurrently referred to, where three sub-chambers 54, delimited by three dividers 56 are depicted. Each one of the dividers 56 is equipped with its own third seal 60 mounted to the dividers 56 proximate the bottom face 28 so as to contact the workpiece 32.

In order to read the differential pressure created within the peripheral chamber 44 by the differential pressure generator 48, a pressure sensor 58 is connected to the peripheral chamber 44. This pressure sensor 58 may be mounted within the peripheral chamber 44 to best read the differential pressure. For redundancy and increased accuracy, more than one pressure sensors 58 may be used to read the differential pressure inside the peripheral chamber 44.

In case the peripheral chamber 44 is divided in two or more sub-chambers 54, each one of the sub-chambers 54 is equipped with its own pressure sensor 58. Advantageously, this allows more accurate measurements of the differential pressure inside the peripheral chamber 44 since the volume of air in a single sub-chamber 54 is smaller, thereby making a loss of seal with the workpiece 32 more influential on the differential pressure inside the affected sub-chamber 54. Again, for redundancy or averaging, each sub-chamber 54 may be equipped with more than one pressure sensors 58.

Figure 5:
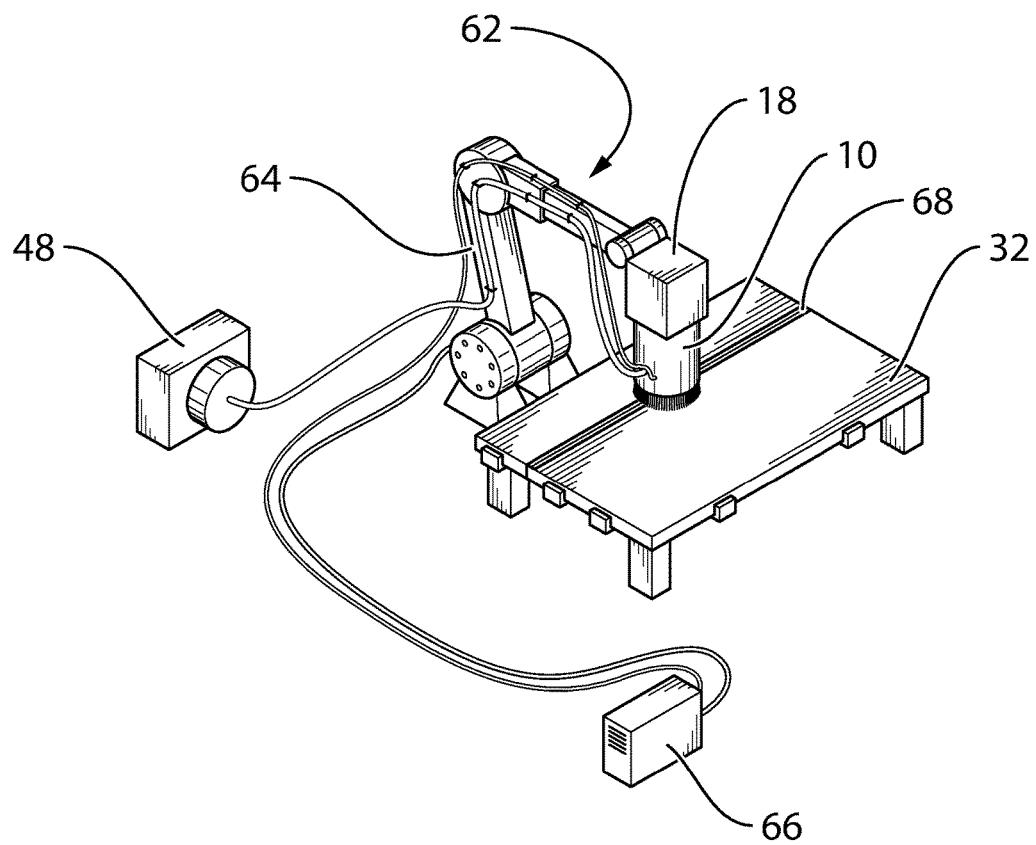
FIG. 5 is an isometric view of the laser containment device of FIG. 1 mounted to a laser head which is itself mounted to a manipulator.

FIG. 5 depicts a laser welding equipment 62 used to weld the workpiece 32. The laser welding equipment 62 comprises the manipulator 64 to which extremity is connected the laser welding head 18 and the laser containment device 10, a controller 66 and the differential pressure generator 48. The controller 66 may be provided with, or separately from the laser containment device 10. The manipulator 64, most usually a computer-controlled robotic arm, is capable of manipulating the laser welding head 18 and the laser containment device 10 to precisely follow a joint 68 to be welded in the workpiece 32.

Figure 6:
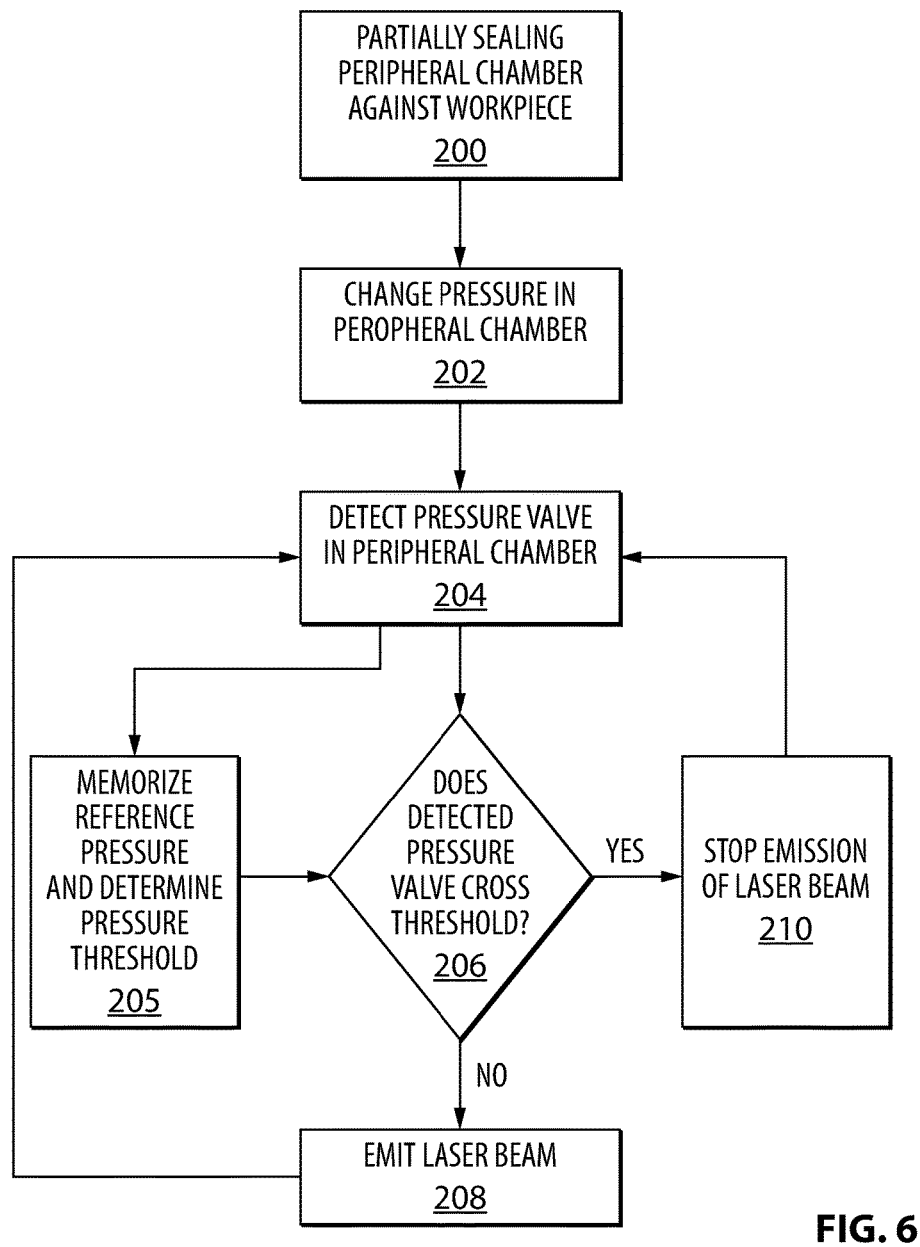
FIG. 6 is a flow chart of a method of laser welding using the laser containment device of FIG. 1 in accordance with another embodiment of the present invention.

FIG. 6 is now concurrently referred to. In preparation for welding, the laser welding head 18 is mounted to the extremity of the manipulator 64 while the laser containment device 10 is mounted to the laser welding head 18. The controller positions the manipulator 64 so that the welding head 18 is in place to start welding. At 200, the inner and outer seals 50, 52 of the laser containment device 10 come into contact with the workpiece 32 so as to at least partially seal the peripheral chamber 44 against the workpiece 32. Once ready, the differential pressure generator 48 is turned on so as to create the differential pressure zone within the peripheral chamber 44 at 202. Simultaneously, the controller 66 starts monitoring the readings of the pressure values at 204 inside the peripheral chamber 44 received from the at least one pressure sensor. Although only one pressure sensor 58 could be used inside the peripheral chamber 44, for the sake of example, it will be presumed that more than one pressure sensors are used. Once the pressure inside the peripheral chamber 44 is stabilized, and that the pressure values are indicative of an adequate seal between the seals 50, 52 and the workpiece 32, then an initial reference pressure value is memorized by the controller 66 and an adequate pressure threshold is determined at 205. At 206, the controller 66 compares the detected pressure values to the predetermined pressure threshold. If the pressure values do not cross the predetermined pressure threshold, that is if the pressure values are within an acceptable range from the initial pressure value, indicative of an adequate seal, then the controller sends a signal to the laser welding head 18 to emit the laser beam 30 towards the workpiece 32 and start welding at 208. As the manipulator 64 follows the joint 68 to be welded, the pressure sensors 58 continuously read the differential pressure inside the peripheral chamber 44 and send these readings to the controller 66 which continuously compares these pressure values to the predetermined pressure threshold. Optionally, the controller 66 could also mathematically manipulate these pressure values before comparing them to the predetermined pressure threshold. For example, the controller 66 could compare two pressure values from two different pressure sensors 58 located in the same sub-chamber 54 and average them to determine the pressure value to be compared with the predetermined pressure threshold. As long as the pressure values do not cross the predetermined pressure threshold, the controller 66 instruct the laser welding head to continue welding. In the case where a loss of seal would occur between the workpiece 32 and either one of the inner and outer seals 50, 52 so that one or more of the pressure readings would cross the predetermined pressure threshold, the controller 66 immediately turns off the emission of the laser beam 30 at 210 until the pressure readings return to being lower than the predetermined pressure threshold.

The value of the predetermined pressure threshold is experimentally determined by correlating a gap between the combination of inner seal 50 and outer seal 52 and the workpiece 32 with the intensity of laser radiation emission in the surroundings of the laser containment device 10. These emission of laser radiation are further dependent on the value of the pressure differential that is generated within the peripheral chamber and on the dimensions of peripheral chamber. Such emissions of laser radiation must be below a maximum permissible exposure according to a recognized safety standard such as IEC60825, a standard on the safety of laser products.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A laser welding equipment for welding a workpiece along a joint, the laser welding comprising:
   a manipulator;
   a laser welding head operative to emit a laser beam to weld the workpiece along the joint;
   a laser containment device for containing a laser beam emitted by the laser welding head, the laser containment device connected to said laser welding head, said laser containment device having:
   an outer shell at least partially enclosing a containment chamber, said outer shell having a laser beam input port for permitting the laser beam to enter said containment chamber, said laser beam input port being distal from a bottom face of said outer shell, and the outer shell being adapted to receive the laser welding head;
   a laser beam output port in said bottom face, said laser beam output port being operative to let the laser beam through so as to reach the workpiece;
   an inner wall;
   a peripheral chamber defined in between said outer shell and said inner wall, said peripheral chamber being open at said bottom face, said peripheral chamber encircling said laser beam output port, wherein said peripheral chamber is split into at least two sub-chambers by at least two dividers, each one of said at least two dividers being equipped with a third seal proximate said bottom face;
   an inner seal mounted to said inner wall proximate said bottom face, said inner seal being operative to contact the workpiece;
   an outer seal mounted to said outer shell proximate said bottom face, said outer seal being operative to contact the workpiece;
   a first pressure sensor adapted to detect a first differential pressure within a first sub-chamber of the at least two sub-chambers of said peripheral chamber and to generate a signal indicative of a value of said first differential pressure;
   a second pressure sensor adapted to detect a second differential pressure within a second sub-chamber of the at least two sub-chambers of said peripheral chamber and to generate a signal indicative of a value of said second differential pressure;
   a differential pressure generator connected to said peripheral chamber, said differential pressure generator being operative to generate said differential pressure at a value that is higher than an ambient pressure outside said peripheral chamber;
   a controller operative to selectively operate said laser welding head based on said signal received from said first pressure sensor and said signal received from said second pressure sensor;
   wherein said manipulator is operative to manipulate said laser welding head and said containment device to follow the joint to be welded in the workpiece during a laser welding operation;
   wherein the controller determines an average value of the differential pressure based on the value of the first differential pressure and the value of the second differential pressure; and
   wherein the controller compares the average value of the differential pressure to a predetermined pressure threshold to determine whether the average value of the differential pressure crosses the predetermined pressure threshold.

2. The laser welding equipment of claim 1, wherein the first sub-chamber of said at least two sub-chambers is equipped with the first pressure sensor and the second sub-chamber of said at least two sub-chambers is equipped with the second pressure sensor.

3. The laser welding equipment of claim 1 wherein said laser beam input port is located opposite said laser beam output port.

4. The laser welding equipment of claim 1 further comprising an accessory port in said outer shell, said accessory port being operative to accommodate a second processing device.

5. The laser welding equipment of claim 1 wherein said pressure sensor is placed inside said peripheral chamber.

6. The laser welding equipment of claim 1 wherein said controller is operative to shut down an emission of the laser beam from said laser welding head upon receiving said signal from said pressure sensor and determining that said differential pressure within said peripheral chamber has crossed a predetermined threshold.

7. The laser welding equipment of claim 1 wherein said laser welding head being connected to a working extremity of said manipulator.

8. The laser welding equipment of claim 1 wherein said manipulator is a computer-controlled robotic arm.

9. The laser welding equipment of claim 1 wherein said pressure sensor is placed inside said peripheral chamber.

10. The laser welding equipment of claim 1 further comprising a second welding head protruding at least partially inside said containment chamber through an accessory port in said outer shell so as to be operative to weld the workpiece through said laser beam output port.

11. A method of laser welding a workpiece using a laser containment device operatively connected to a laser welding head operative to emit a laser beam, the method comprising:
    encircling with a peripheral chamber an opening in a first chamber of said containment device, said opening being operative to accommodate said laser beam, said peripheral chamber being located at a working end of said laser containment device;

sealing said peripheral chamber of said laser containment device from said first chamber, said sealing occurring against the workpiece;

creating a differential pressure zone in said peripheral chamber using a differential pressure generator connected to said peripheral chamber, said differential pressure generator being operative to create a pressure value within said peripheral chamber that is higher than an ambient pressure outside said peripheral chamber, wherein said differential pressure zone being at a higher pressure than an ambient pressure outside an outer shell of said laser containment device;

detecting a pressure value within said peripheral chamber using a pressure sensor, said pressure sensor being in communication with said peripheral chamber;

manipulating said laser welding head and said laser containment device to follow a joint to be welded in the workpiece using a computer-controlled robotic arm;

generating a signal indicative of said pressure value within said peripheral chamber using said pressure sensor when said laser welding head and said laser containment device are manipulated to follow the joint to be welded in the workpiece, said pressure sensor being operative to send said signal to a controller;

determining a predetermined pressure threshold using said controller, said predetermined pressure threshold being based on an acceptable range of said detected pressure value from an initial pressure value, said initial pressure value being indicative of an adequate seal;

comparing said detected pressure value with said predetermined pressure threshold using said controller when said laser welding head and said laser containment device are manipulated to follow the joint to be welded in the workpiece; and using said controller for deciding whether or not to emit the laser beam toward the workpiece based on a result of said comparison when said laser welding head and said laser containment device are manipulated to follow the joint to be welded in the workpiece, said controller being operative to send a laser beam operation signal to said laser welding head when said detected pressure value is within said predetermined pressure threshold and to stop sending said laser beam operation signal to said laser welding head when said detected pressure value crosses said predetermined pressure threshold.

12. The method of claim 11 further comprising guiding said laser welding head using a computer-controlled robotic arm.

13. A laser welding equipment for welding a workpiece, the laser welding equipment comprising:
a manipulator;
a laser welding head operative to emit a laser beam to weld the workpiece along the joint;
a laser containment device for containing a laser beam emitted by the laser welding head, the laser containment device connected to said laser welding head, said laser containment device having:
an outer shell at least partially enclosing a containment chamber, said outer shell receiving said laser welding head within said containment chamber and distal a bottom face of said outer shell;
a laser beam output port in said bottom face operative to let the laser beam reach the workpiece;
an inner wall;
a peripheral chamber defined in between said outer shell and said inner wall, said peripheral chamber being open at said bottom face, said peripheral chamber encircling said laser beam output port, wherein said peripheral chamber is split into at least two sub-chambers by at least two dividers, each one of said at least two dividers being equipped with a third seal proximate said bottom face;
an inner seal mounted to said inner wall proximate said bottom face, said inner seal being operative to contact the workpiece; and
an outer seal mounted to said outer shell proximate said bottom face, said outer seal being operative to contact the workpiece;
a first pressure sensor adapted to detect a first differential pressure within a first sub-chamber of the at least two sub-chambers of said peripheral chamber and to generate a signal indicative of a value of said first differential pressure;
a second pressure sensor adapted to detect a second differential pressure within a second sub-chamber of the at least two sub-chambers of said peripheral chamber and to generate a signal indicative of a value of said second differential pressure;
a differential pressure generator connected to said peripheral chamber, said differential pressure generator being operative to generate said differential pressure at a value that is higher than an ambient pressure outside said peripheral chamber;
a controller operative to selectively operate said laser welding head based on said signal received from said first pressure sensor and said signal received from said second pressure sensor; and
wherein said manipulator is operative to manipulate said laser welding head and said containment device to follow the joint to be welded in the workpiece during a laser welding operation;
wherein the controller determines an average value of the differential pressure based on the value of the first differential pressure and the value of the second differential pressure; and
wherein the controller compares the average value of the differential pressure to a predetermined pressure threshold to determine whether the average value of the differential pressure crosses the predetermined pressure threshold.

14. The laser welding equipment of claim 13, wherein the first sub-chamber of said at least two sub-chambers is equipped with the first pressure sensor and the second sub-chamber of said at least two sub-chambers is equipped with the second pressure sensor.

15. The laser welding equipment of claim 14 wherein said attachments are located opposite said laser beam output port.

16. The laser welding equipment of claim 13 further comprising an accessory port in said outer shell, said accessory port being operative to accommodate a second processing device.

17. The laser welding equipment of claim 13 wherein said pressure sensor is placed inside said peripheral chamber.

18. The laser welding equipment of claim 13 wherein said controller is operative to shut down an emission of the laser beam from said laser welding head upon receiving said signal from said pressure sensor and determining that said differential pressure within said peripheral chamber has crossed the predetermined pressure threshold.

19. The laser welding equipment of claim 13 further comprising a manipulator, said laser welding head being connected to a working extremity of said manipulator.

20. The laser welding equipment of claim 19 wherein said manipulator is a computer-controlled robotic arm.

21. The laser welding equipment of claim 13 wherein said pressure sensor is placed inside said peripheral chamber.

22. The laser welding equipment of claim 13 further comprising a second welding head protruding at least partially inside said containment chamber through an accessory port in said outer shell so as to be operative to weld the workpiece through said laser beam output port.

23. The laser welding equipment of claim 6, wherein a value of the predetermined threshold is determined based on correlating a gap between a combination of the inner seal, the outer seal, and the workpiece with an intensity of laser radiation emission in surroundings of the laser containment device.

24. The laser welding equipment of claim 13, wherein a value of the predetermined pressure threshold is determined based on correlating a gap between a combination of the inner seal, the outer seal, and the workpiece with an intensity of laser radiation emission in surroundings of the laser containment device.

* * * * *

UNITED STATES PATENT AND TRADEMARK OFFICE
CERTIFICATE OF CORRECTION

PATENT NO. : 10,471,539 B2
APPLICATION NO. : 15/278720
DATED : November 12, 2019
INVENTOR(S) : Simon Fissette et al.

Page 1 of 1

It is certified that error appears in the above-identified patent and that said Letters Patent is hereby corrected as shown below:

In the Specification

Column 8, Line 21, delete "operation:" and insert -- operation; --

Signed and Sealed this
Third Day of March, 2020

Andrei Iancu
*Director of the United States Patent and Trademark Office*